Jan. 28, 1969   W. W. SCHWARZ ET AL   3,423,931
SAFE-ARM DEVICE FOR SOLID PROPELLANT ROCKET MOTORS
Filed July 27, 1967

William W. Schwarz
Jack W. Shepherd    INVENTORS

BY
ATTORNEY

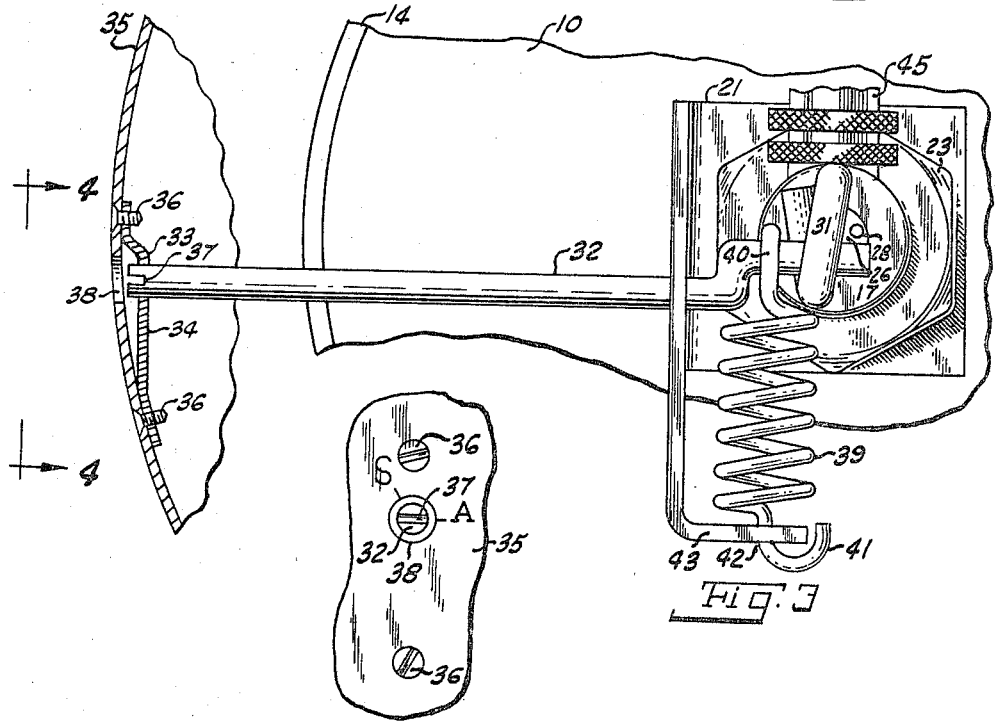
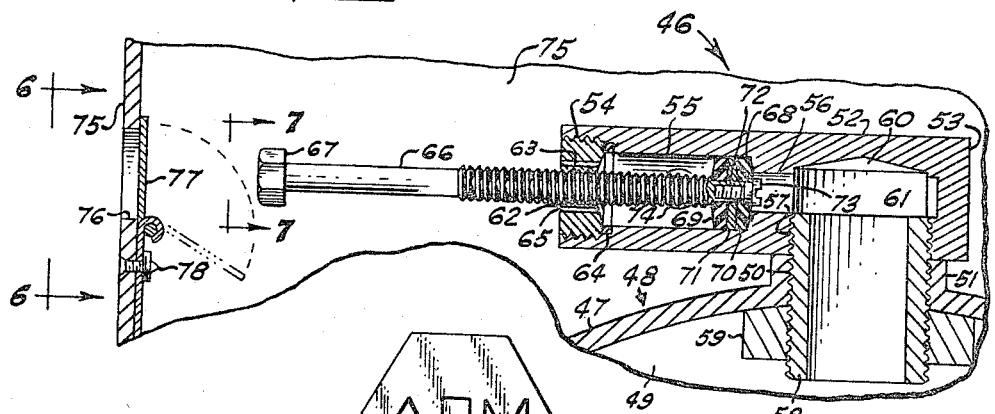
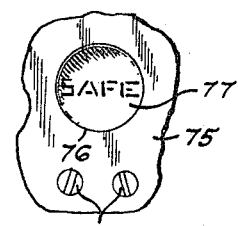

William W. Schwarz
Jack W. Shepherd    INVENTORS

BY

ATTORNEY

United States Patent Office 3,423,931
Patented Jan. 28, 1969

3,423,931
SAFE-ARM DEVICE FOR SOLID PROPELLANT
ROCKET MOTORS
William W. Schwarz, Huntsville, and Jack W. Shepard, Madison, Ala., assignors to Thiokol Chemical Corporation, Bristol, Pa., a corporation of Delaware
Filed July 27, 1967, Ser. No. 656,565
U.S. Cl. 60—39.47        10 Claims
Int. Cl. F02c 3/26, 7/26; F02k 9/04

ABSTRACT OF THE DISCLOSURE

A safe-arm device including a tubular type body having a double-ended piston therein, which functions as a seal at either end of the body, thus, preventing accidental or inadvertent ignition yet permitting ignition of a solid propellant rocket motor or other propulsive or explosive devices.

BACKGROUND OF THE INVENTION

Field of the invention

There have been many serious accidents resulting from inadvertent ignition of solid propellant rocket motors and other propulsion or explosive devices. Such accidents have necessitated strong requirements for safe-arm devices for the ignition systems. Such a safe-arm device should have the smallest possible number of moving and stationary parts for maximum reliability. This invention was designed to meet these requirements for simplicity of construction, inexpensive manufacture, and highly reliable operation. Precision machining of its various parts is not required, and all of its parts stationary, moving or sealing can be easily replaced. The safe-arm device can be installed prior to the shipment or other movement of the solid propellant rocket motor, and upon arrival at its destination, the particular ignition system for the ignition of the solid propellant rocket motor may then be installed and the ignition system will then be safe from accidental or inadvertent ignition. When it is desired to operate the solid propellant rocket motor, only a few adjustments are required to place the device in the armed condition. The safe-arm device also permits periodic inspection of the ignition system to determine the condition of the ignition system as to its ability to operate or to determine whether it has been damaged from environmental conditions during its period of inactivity.

DESCRIPTION OF THE PRIOR ART

Many safe-arm devices have been developed, some have been directly incorporated into the ignition system and require electrical switches for the connect and disconnect of the circuitry of the ignition system, but such safe-arm devices are not easily removed for periodic inspections to determine their operability or inoperability. Such devices also do not permit ready access to the ignition system for purposes of inspection and replacement when necessary.

Many safe-arm devices are in actual use, but their cost of manufacture in exceedingly high and none are believed to be as simple to operate or as efficient or foolproof as the instant invention.

SUMMARY OF THE INVENTION

This invention, therefore, relates to improvements in safe-arm devices that are particularly directed to prevent accidental or inadvertent ignition of a solid propellant rocket motor or other propulsive or explosive devices.

Most ignition systems for solid propellant rocket motors consist of three parts—an initiator, also commonly called a squib, a primer charge and a main charge. This main charge may be pyrotechnic pellets or it may be a small amount of solid propellant that is easily ignited by the primer charge. The sequence of events in ignition of a rocket motor is as follows:

The initiator is activated by percussion or by an electrical current. The initiator flame and gases, in turn, ignite the primer charge which, in turn, starts the combustion of the main charge. It is the flame and gases from combustion of the main charge that ignites the propellant in the rocket motor. Interruption of this sequence of events at any point will render the ignition system safe, i.e., it will not ignite the solid propellant in the rocket motor. This invention interrupts the chain of events by imposing a mechanical block between the initiator, or squib, and the primer charge in the ignition system. It does not prevent actuation of the initiator but serves, in the safe position, to divert the flame and gases from the initiator so that they do not come into contact with the primer charge. These flames and gases are vented to the atmosphere through special ports.

The safe-arm device embodying the invention has an operative position of parts that will permit the solid propellant to be ignited, and it also has an inoperative position of parts that will prevent ignition of the solid propellant in the solid propellant rocket motor, thus, by a few simple movements of the parts of the safe-arm device, the solid propellant rocket motor can be ignited or ignition can be prevented.

It is an object of this invention, therefore, to provide an efficient, simple and inexpensive safe-arm device for a solid propellant rocket motor that will prevent accidental or inadvertent ignition of the solid propellant in the solid propellant rocket motor.

With the above and other objects and advantages in view that may appear to one skilled in the art, it will be clearly understood that the invention will consist of the special arrangement of parts as will be later described and illustrated in the accompanying drawings, in which:

BRIEF DESCRIPTION OF THE DRAWINGS

FIGURE 3 is an elevational view, on a slightly reduced scale, partly in section and partly broken away, taken on the line 3—3 of FIGURE 1;

FIGURE 4 is a fragmentary elevational view, partly broken away, taken on the line 4—4 of FIGURE 3;

FIGURE 5 is a longitudinal sectional view, partly broken away, illustrating the manner of installation of another form of the invention on a motor case for a solid propellant rocket motor;

FIGURE 6 is a fragmentary elevational view, taken on the line 6—6 of FIGURE 5;

FIGURE 7 is a similar view to FIGURE 6, taken on the line 7—7 of FIGURE 5;

DESCRIPTION OF THE PREFERRED EMBODIMENTS

Figures 1, 2:
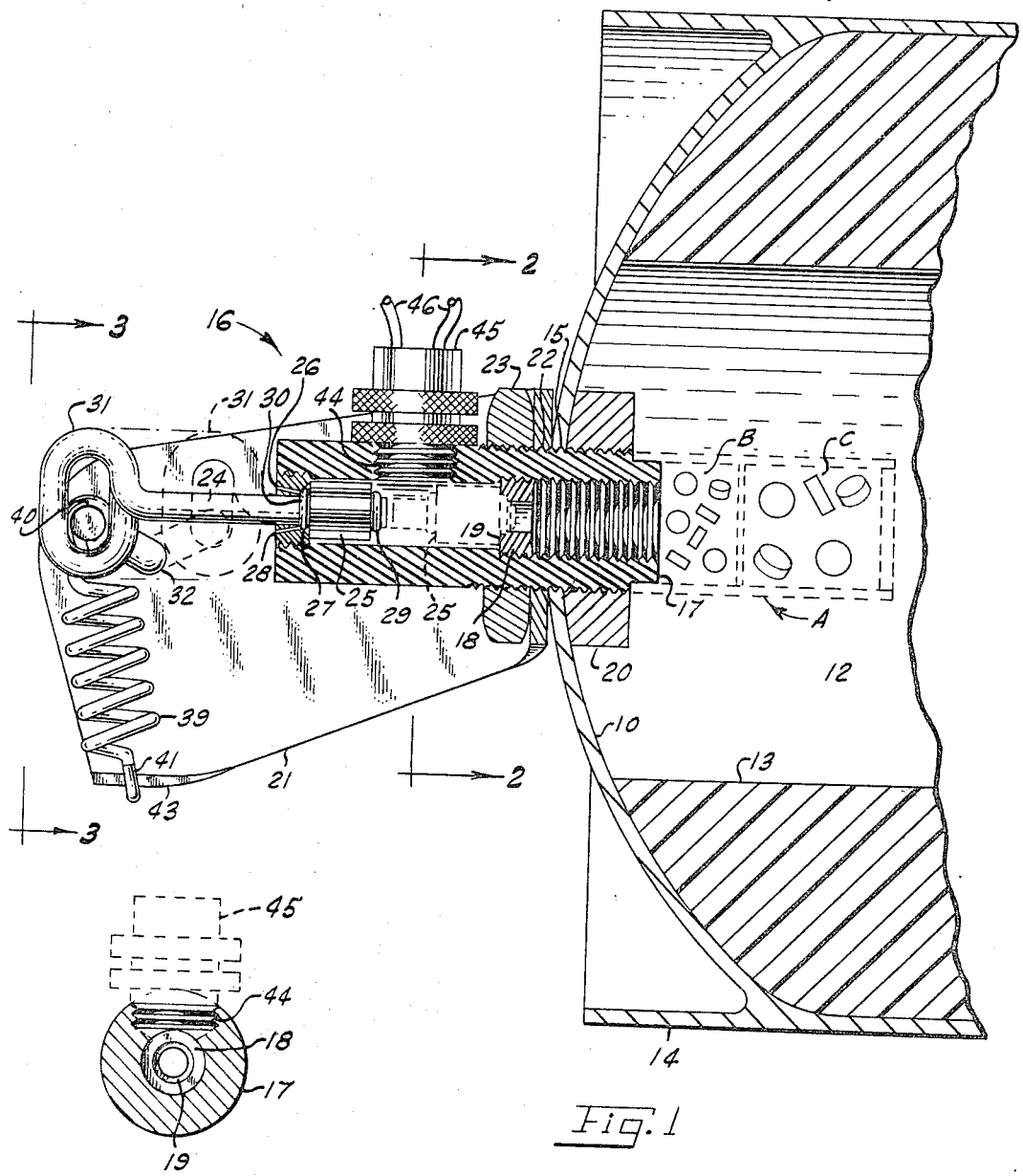
FIGURE 1 is a longitudinal sectional view, partly in elevation and partly broken away, to illustrate the manner in which one form of the invention is installed on a motor case for a solid propellant rocket motor.
FIGURE 2 is a vertical sectional view with parts removed, taken on the line 2—2 of FIGURE 1 and showing in dotted lines the initiator of FIGURE 1.

Referring more in detail to the drawings and more especially to FIGURES 1 to 4 inclusive thereof, wherein like parts are designated by like reference numerals, the reference numeral 10 is used to designate a domed head end of a motor case 11 for a solid propellant rocket motor.

The motor case 11 forms a combustion chamber 12 in which is positioned a solid propellant and as is conventional, the motor case 11 is provided with a forward skirt 14. The head end 10 of the motor case 11 is provided with a centrally located opening 15 that communicates with the combustion chamber 12 of the motor case 11 and it is the opening 15 in which this form of the safe-arm device 16, embodying the invention, is installed.

The safe-arm device 16, illustrated in these figures, comprises a tubular open ended body 17 which at its aft end extends through the opening 15 in the head end 10 of the motor case 11 to terminate a short distance within the combustion chamber 12 of the motor case 11.

Before the body 17 is installed in the opening 15 in the head end 10 of the motor case 11, a seat 18, having a chamfered opening 19 therein, is threadably mounted in the body 17 through the aft end thereof and after the body 17 has been installed, a jam nut 20 is then threadably engaged with the body 17 until the jam nut 20 contacts the inner surface of the head end 10 of the motor case 11. A mounting bracket 21 is then mounted on the body 17 forwardly of the head end 10 of the motor case 11 by means of an opening 22 therein and a second jam nut 23 is threadably engaged with the forward end of the body 17 and is tightened until it engages and moves the bracket 21 into engagement with the outer surface of the head end 10 of the motor case 11, and will then, in conjunction with the jam nut 20, rigidly secure the body 17 to the head end 10 of the motor case 11.

A piston rod 24, having a piston 25 on the aft end thereof, is mounted in the body 17 for reciprocal movement therein and a seat 26, having a chamfered opening 27 therein, is threadably engaged within the forward end of the body 17. The seat 26 also has a plurality or angularly disposed ports 28 therein that provide communication between the body 17 and the atmosphere. An O-ring 29 is secured to the piston rod 24, aft of the piston 25 and the O-ring 29 will engage the chamfered opening 19 in the seat 18 to seal the aft end of the body 17, and an O-ring 30, secured to the piston rod 24 forwardly of the piston 25, will engage the chamfered opening 27 in the seat 26 to seal the forward end of the body 17.

The forward end of the piston rod 24 is bent upon itself to provide a yoke 31 and the aft end of an offset crank 32 is operably received in the yoke 31 on the rod 24. The crank 32 extends at right angles from its engagement with the yoke 31 on the piston rod 24 to be received at its forward end in an opening 33 in an alinement bracket 34 that is secured to an air frame 35 for the solid propellant rocket motor by well-known fastening means 36. The forward end of the crank 32 is provided with a screw driver slot 37 which is alined by means of the bracket 34 with an opening 38 in the air frame 35.

Viewing the forward end of the crank 32 and the slot 37 therein through the opening 38 in the air frame 35, it will be seen that the slot 37 can be directed towards or alined with the letters S and A on the outer surface of the air frame 35 adjacent the opening 38. If the slot 37 is directed towards or alined with the letter A for ARM as in FIGURE 4, the piston 25 will assume the position as shown in FIGURE 1 and an igniter A that is mounted on the aft end of the body 17, will ignite the solid propellant 13 in the combustion chamber 12 of the motor case 11, by means of a primer charge B and a main charge C.

If the slot 37 is directed towards or alined with the letter S for SAFE, the piston 25 will assume the dotted line position shown in FIGURE 1 and the igniter A will be unable to ignite the solid propellant 13 in the combustion chamber 12 of the motor case 11.

To place tension on the crank 32 and prevent movement thereof that is not occasioned by deliberate manual movement thereof, a tensioned coil spring 39 has one end 40 thereof engaging the crank 32, as shown in FIGURE 3, and the opposite end 41 thereof extended into an opening 42 in a foot portion 43 that is formed by bending the foot portion 43 outwardly of the bracket 21 at right angles thereto, thus, an over-the-center toggle action is provided that positively retains the piston 25 in either of the safe or arm positions, as will be later described.

The body 17 has a threaded bore 44 therein which is adapted to threadably receive the well-known initiator 45 which, when activated by means of an electrical current through the leads 46, will ignite the igniter A, which will then ignite the solid propellant 13 in the combustion chamber 12 of the motor case 11, if the slot 37 is directed towards or alined with the letter A, as in FIGURE 4.

In the operation of the form of the invention shown in FIGURES 1 to 4 inclusive, it is to be assumed that the safe-arm device 16 has been assembled and installed as previously described.

Since FIGURES 1 and 4 inclusive show the armed position of the safe-arm device, the positions of the piston 25 will be described.

If the slot 37 is in the position, as shown in FIGURE 4, the O-ring 30 is engaged in the opening 27 in the seat 26, at this time it will be noted that communication between the combustion chamber 12 in the motor case 11 and the initiator 45 is provided, by means of the tubular body 17. Thus if the initiator 45 is actuated by means of the electrical leads 46, the primer charge B in the igniter A will be ignited and the flame and hot gases, created by the ignition of the primer charge B, will ignite the main charge C and the flame and hot gases thus created will enter the combustion chamber 12 of the motor case 11 and ignite the solid propellant 13 therein. If, however, the solid propellant rocket motor is to be stored or transported from one location to another, then the slot 27 will be directed towards or alined with the letter S. At this time the piston 25 will assume the dotted line position shown in FIGURE 1 and the O-ring 29 will engage the opening 19 to the seat 18. This position of the piston 25 will close off communication of the combustion chamber 12 of the motor case 11 with the initiator 45.

If, at this time, the initiator 45 is accidently or inadvertently actuated, the flame and hot gases, created by the actuation of the initiator 45, will pass harmlessly outwardly of the body 17 to the atmosphere by means of the ports 28 in the seat 26 and the solid propellant 13 in the combustion chamber 12 of the motor case 11, will not be ignited and will remain safe from any accidental or inadvertent actuation of the initiator 45 and the over-the center toggle action of the spring 39 will positively maintain the piston 25 in the safe or armed positions, as previously described.

In the form of the safe-arm device 46, shown in FIGURES 5 to 7 inclusive, the reference numeral 47 is used to designate the head end of a motor case 48 in which there is a combustion chamber 49. The head end 47 of the motor case 48 is likewise provided with a central opening 50 that is encompassed by an annular flange 51 on the outer surface of the head end 47 of the motor case 48.

The safe-arm device 46 comprises a cylindrical body 52, having a closed aft end 53, an internally threaded circular recess 54 at the forward end, a first bore 55 communicating with the recess 54 but of smaller diameter than the recess 54 and a second bore 56 communicating with the first bore 55 but of smaller diameter than the first bore 55. The recess 54, first bore 55 and second bore 56 extend longitudinally of the body 52 and are in axial alinement with each other.

The body 52 has an opening 57 adjacent to the closed aft end 53 thereof, which extends through one wall of the body 52 and is at right angles to the second bore 56 and communicates therewith. Rigidly secured in the opening 57, at one end thereof, is a tubular connector 58 which is inserted into the opening 50 in tne head end 47 of the motor case 48 and a jam nut 59 threadably connected to that end of the connector 58 that extends into the combustion chamber 49 of the motor case 48, when tightened, will draw the outer surface of the body 52 into engagement with the rim of the flange 51 and thus retain the body 52 in rigid relation to the motor case 48. A second recess 60, coinciding with one end of the second bore 56, is formed in the body 52 in axial alinement with the connector 58 and a primer charge 61, for igniting a solid propellent positioned in the combustion chamber 49 of the motor case 48, is placed in the recess 60, as shown in FIGURE 5.

A set 62, having a centrally located internally threaded bore 63 therein, is threadably engaged with the recess 54 and gasket 64 positioned in the recess 54 prior to the connection of the seat 62 in the recess 54, seals the seat 62 with relation to the first bore 55. The seat 62 also has a row of exhaust ports 65 therein for a purpose to be later described. Before the seat 62 is mounted in the recess 54, a screw threaded piston rod 66, having an enlarged head end 67, is threadably engaged in the threaded bore 63 and a piston 68, comprising a pair of circular gaskets 69 and 70, separated by a washer 71, are mounted on a reduced end 72 of the piston rod 66 that extends into the first bore 55 in the body 52 and is retained in fixed position on the reduced end 72 by well-known fastening means 73. A mounting opening 74 for a conventional initiator, not shown, is provided in one wall of the body 52 and communicates with and extends at right angles from the first bore 55, as shown in FIGURE 5.

An air frame 75 for the solid propellant rocket motor 48 is provided with an opening 76 which is in alinement with the head 67 of the piston rod 66 and a spring biased access door 77, to close the opening 76, is operably mounted on the interior surface of the air frame 75 by well-known mounting means 78. Viewing FIGURE 6, it will be noted that the word SAFE is placed on the outer surface of the access door 77 so that it can be viewed through the opening 76 and viewing FIGURE 7, it will be noted that the face of the head 67 of the piston rod 66, has the word ARM placed thereon and the word ARM is also visible through the opening 76.

In the operation of the form of the invention shown in FIGURES 5 to 7 inclusive, it will also be assumed that the safe-arm device 46 has been assembled and installed as previously described.

Since FIGURES 5 to 7 inclusive show the safe position of the safe-arm device, the positions of the piston 68 will be described.

In the safe position shown in FIGURE 5, the head 67 of the piston rod 66 has been engaged by a suitable tool which has been inserted through the access opening 76 for this purpose. The head 67 has been rotated until the gasket 70 has engaged the forward end of the second bore 56 and has sealed the first bore 55 from communication with the second bore 56. There is, therefore, no communication of the initiator mounted in the opening 74 with the primer charge 61 in the recess 60. If at this time, the initiator is accidentally or inadvertently actuated, the initiator will be unable to ignite the primer charge 61 and any flame or hot gases created by the activation of the initiator will pass outwardly of the body 52 to the atmosphere by means of the ports 65 in the seat 62. Thus, the solid propellant rocket motor can be stored or transported from location to location without the danger of accidental or inadvertent ignition of the solid propellant in the combustion chamber 49 of the motor case 48.

On the other hand, if it is desired to arm the safe-arm device, the head 67 will be engaged by a suitable tool, as previously described, and will be rotated to retract the piston 68 from the position shown in FIGURE 5 until the gasket 69 engages the seat 62 and thus provide communication between the initiator and the prime charge 61. At this time, if the initiator is activated, the flame and hot gases, created by such activation, will impinge upon the primer charge 61, ignite it and subsequently ignite the solid propellant in the combustion chamber 49 in the motor case 48.

Retraction of the piston 68 also results in sufficient movement of the head 67 so that it holds the access door 77 open and the word ARM on the head 67 will show in the opening 76, thus, giving a visual indication of the armed condition of the device 46.

This form of the invention is another example of a double-ended sealing piston and it is the rotation of the piston rod 66 that causes the safe-arm device to operate. While this form of the invention is more simple in construction and operation, the basic principal of providing or not providing communication between the initiator and the primer charge 61 is identical.

Figure 8:
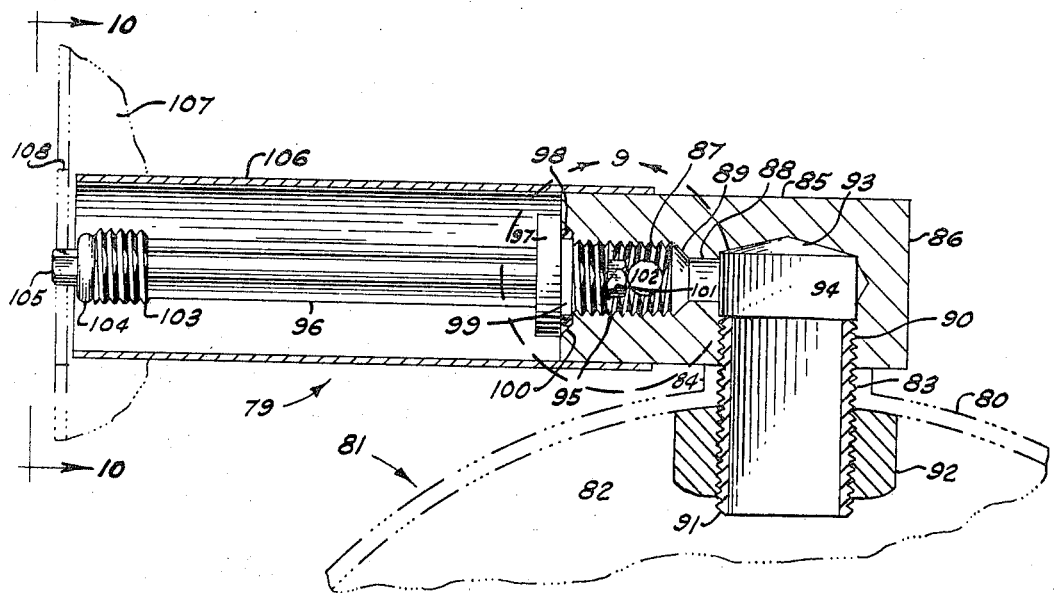
FIGURE 8 is a longitudinal sectional view illustrating the manner of installation of still another form of the invention in a dotted line representation of a motor case for a solid propellant rocket motor.
Figure 9:
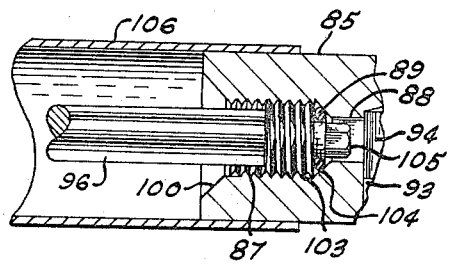
FIGURE 9 is a fragmentary sectional view of that portion of FIGURE 8 encompassed by the dotted line circle 9.
Figure 10:
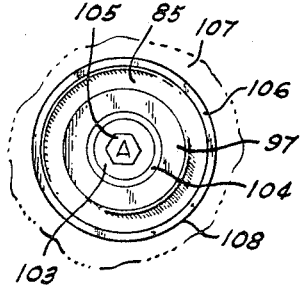
FIGURE 10 is a fragmentary elevational view, taken on the line 10—10 of FIGURE 8.

In the form of the safe-arm device 79, shown in FIGURES 8 to 10 inclusive, the reference numeral 80 is used to designate the head end of a motor case 81 in which there is a combustion chamber 82. The head end 80 of the motor case 81 is likewise provided with a central opening 83 that is encompassed by an annular flange 84 on the outer surface of the head end 80 of the motor case 81.

The safe-arm device 79 comprises a cylindrical body 85 having a closed aft end 86, a first bore 87, a second bore 88 communicating with the first bore 87, but of smaller diameter than the first bore 87 and separated therefrom by a bevelled shoulder or seat 89. The first bore 87 and the second bore 88 extend longitudinally of the body 85 and are in axial alinement with each other.

The body 85 has an opening 90 adjacent the closed aft end thereof, which extends through one wall of the body 85 and is at right angles to the second bore 88 and communicates therewith. Rigidly secured in the opening 87, at one end thereof, is a tubular connector 91 which is inserted into the opening 83 in the head end 80 of the motor case 81 and a jam nut 92 threadably connected to that end of the connector 91 that extends into the combustion chamber 82 of the motor case 81, when tightened, will draw the outer surface of the body 85 into engagement with the rim of the flange 84 and thus retain the body 85 in rigid relation to the motor case 81. A circular recess 93 is formed in the body 85 adjacent the closed aft end 86 of the body 85, the recess 93 is in communication with the second bore 88 and in axial alinement with the connector 91 and a primer charge 94 for igniting a solid propellant positioned in the combustion chamber 82 of the motor case 81 is placed in the recess 93, as shown in FIGURE 8.

The bore 87 is internally threaded and will receive therefore the enlarged threaded portion 95 of a piston rod 96 and a piston 97 on the piston rod 96 is preceded by an O-ring 98 that is mounted on a smooth ring portion 99 on the piston rod 96 that is intermediate of the threaded portion 95 and the piston 97. The O-ring 98 is adapted to be received in a bevelled shoulder or seat 100 that is contiguous with the forward end of the bore 87 and a bolt 101 is threaded into the aft end of the threaded portion 95. A mounting opening 102 for a conventional initiator, not shown, is provided in one wall of the body 85 and communicates with and extends at right angles from the first bore 87, as shown in FIGURE 8.

The opposite end of the piston rod 96 is also provided with an enlarged threaded portion 103 which is adapted to be threaded into the bore 87, as shown in FIGURE 9 for a purpose to be later described. An O-ring 104 preceds the threaded portion 103 on the piston rod 96 and a bolt 105 is also threaded into the end of the piston rod 96 that extends forwardly of the threaded portion 103 thereon.

A guide tube 106 is slipped onto the forward end of the body 85 and extends forwardly thereof to terminate adjacent to an air frame 107 for the solid propellant rocket motor. An opening 108 is provided in the air frame 107 for a purpose to be later described and the opening 108 is in axial alinement with the bolt 105 in the piston rod 96.

In the operation of the form of the invention shown in FIGURES 8 to 10 inclusive, it will also be assumed that the safe-arm device 79 has been assembled and installed as previously described.

Since FIGURES 8 to 10 inclusive show the armed position of the safe-arm device, the positions of the threaded portions 95 and 103 on the piston rod 96 will described.

In the armed position of FIGURE 8, the threaded portion 95 on the piston rod 96 is threaded into the bore 87 and the O-ring 98 is engaged with the bevelled shoulder or seat 100. At this time it will be noted that communication beween the opening 102 in which the initiator is mounted and the primer charge 94 is provided by means of the first bore 87 and the second bore 88 in the body 85. Thus, if the initiator is actuated, the flame and hot gases created by such activation, will impinge upon the primer charge 61, ignite it and subsequently ignite the solid propellant in the combustion chamber 82 in the motor case 81. Viewing FIGURE 10, it will be noted that the letter A appears on the face of the bolt 105 which may be viewed through the opening 108, thus indicating that the safe-arm device is in armed position.

It will be understood that a suitable tool has been utilized to engage the bolt 105 and threadably engage the threaded portion 95 on the piston rod 96 with the bore 87. To place the safe-arm device in the safe position, the same tool is again engaged with the bolt 105 and the threaded portion 95 will be disengaged from the bore 89. The piston rod 96 will then be removed outwardly of the air frame 107 through the opening 108 in the air frame 107. The piston rod 96 will be turned around so that the threaded portion 103 can be inserted first, so that it will engage the bore 87, as shown in FIGURE 9. At this time and in this position the O-ring 104 will engage the shoulder or seat 89. Thus communication between the opening 102 and the primer charge 94 has been shut off, therefore, if at this time the initiator is accidently or inadvertently actuated, the initiator will be unable to ignite the primer charge 94 and any flame or hot gases created by the activation of the initiator will pass harmlessly outwardly of the body 85 to the atmosphere through the bore 87 which is now open at its forward end. Thus, the solid propellant rocket motor can be stored or transported from location to location without the danger of accidental or inadvertent ignition of the solid propellant in the combustion chamber 82 of the motor case 81. At this time the letter S which appears on the face of the bolt 101 may be viewed through the opening 108, thus indicating that the safe-arm device is in safe position.

This form of the invention is another example of a double-ended sealing piston and it is the reversal of the piston rod 96 that causes the safe-arm device to operate. While this form of the invention may be more simple in construction and operation, the basic principal of providing or not providing communication between the ignition and the primer charge 94 is identical.

There has thus been illustrated and described, three different forms of a safe-arm device in which a double-ended piston will arm or make safe an ignition system for a solid propellant rocket motor to prevent accidental or inadvertent ignition of a solid propellant in a solid propellant rocket motor.

Having thus described the invention what is claimed as new and desired to be secured by Letters Patent is:

1. A safe-arm device for a solid propellant rocket motor including a motor case having a head end thereon and a combustion chamber therein in which is positioned a solid propellant, comprising a body rigidly connected to the motor case and having communication with the combustion chamber therein, a piston rod having double sealing portions thereon mounted in said body, an initiator mounted on said body and having communication therewith, said piston rod being movable to permit communication of said initiator with said solid propellant for the ignition thereof or prevent communication of said initiator with said solid propellant to prevent accidental or inadvertent ignition of said solid propellant.

2. A safe-arm device as in claim 1, wherein a centrally located opening is provided in the head end of said motor case and means is provided for mounting said body in said centrally located opening.

3. A safe-arm device as in claim 1, wherein a seat is provided in said body so that when one of the sealing portions of said piston rod is engaged with said seat said safe-arm device will be in armed condition.

4. A safe-arm device as in claim 1, wherein a seat is provided in said body so that when one of the sealing portions of said piston rod is engaged with said seat said safe-arm device will be in safe condition.

5. A safe-arm device as in claim 3 wherein reciprocal movement of said piston rod will cause the engagement of said sealing means with said seat.

6. A safe-arm device as in claim 3 wherein reversal of said piston rod will cause the engagement of said sealing means with said seat.

7. A safe-arm device as in claim 5 wherein a yoke is provided on the forward end of said piston rod and is engaged by the offset end of a crank whereby reciprocal movement of said piston rod is provided.

8. A safe-arm device as in claim 5 wherein said piston rod is threadably mounted in said body and rotation of said piston rod will cause the engagement of said sealing means with said seat.

9. A safe-arm device as in claim 1 wherein indicia is provided to indicate whether said safe-arm is in safe or armed positions.

10. A safe-arm device as in claim 1 wherein means is provided in said body to vent said body to the atmosphere.

References Cited
UNITED STATES PATENTS

| 876,240 | 1/1908 | Schlamb | 123—183 |
| 2,665,088 | 1/1954 | Lobelle | 89—1.01 |
| 2,939,393 | 6/1960 | Johnson et al. | 102—70 |
| 3,111,810 | 11/1963 | Branman et al. | 60—39.82 |

FOREIGN PATENTS 1,295,500   5/1962   France.

CARLTON R. CROYLE, *Primary Examiner.*

U.S. Cl. X.R.

60—39.82, 256; 102—70